United States Patent [19]
Stoughton

[11] 3,718,835
[45] Feb. 27, 1973

[54] DUAL DIMMER SWITCH CIRCUIT
[75] Inventor: George R. Stoughton, Anderson, Ind.
[73] Assignee: General Motors Corporation, Detroit, Mich.
[22] Filed: Aug. 23, 1971
[21] Appl. No.: 173,831

[52] U.S. Cl..................................................315/83
[51] Int. Cl.......................................................B60q
[58] Field of Search................................315/82, 83

[56] References Cited

UNITED STATES PATENTS 2,011,677  8/1935  Douglas..................................315/83
2,014,592  9/1935  Schwarze...............................315/83

Primary Examiner—Roy Lake
Assistant Examiner—James B. Mullins
Attorney—J. L. Carpenter et al.

[57] ABSTRACT

A vehicle lighting system for lighting the roadway ahead of a vehicle. The system includes arrays of high and low beam headlamps and provides for selectively energizing either array. Floor mounted and the steering column mounted dimmer switches each having first and second switch settings control energization of the lamp arrays by a power source. Changing the setting of either dimmer switch in any sequence alternately energizes the lamp arrays.

1 Claim, 2 Drawing Figures

| | COLUMN SWITCH | | | |
|---|---|---|---|---|
| SETTING | 1 | | 2 | |
| FLOOR SWITCH  1 | HIGH | A+<br>B-<br>C- | LOW | A-<br>B-<br>C+ |
| 2 | LOW | A+<br>B+<br>C- | HIGH | A-<br>B+<br>C+ |

INVENTOR.
George R. Stoughton
BY
Paul Fitzpatrick
ATTORNEY

DUAL DIMMER SWITCH CIRCUIT

This invention relates to vehicle lighting systems and, more particularly, to vehicle lighting systems employed for lighting the roadway ahead of a moving vehicle.

Many motor vehicles presently employ two selectively energizable lamp arrays for illuminating the roadway. One of these arrays customarily includes several parallel connected lamps referred to as "high beam" headlamps for illuminating the roadway a considerable distance ahead of the vehicle. The other lamp array is also comprised of several parallel connected lamps referred to as "low beam headlamps" that are energized for illuminating the roadway closer to the vehicle and are employed to maintain adequate roadway illumination when passing oncoming motorists. These lighting systems also generally employ a "dimmer switch" having two settings for selectively energizing either the high beam headlamps or the low beam headlamps in accordance with existing driving conditions. In the United States the dimmer switch has usually been located on the floor of the vehicle for actuation by the vehicle operator's foot. It has recently been proposed to equip vehicles in the United States with dimmer switches that are operable by the hand of the vehicle operator. However, vehicle operators who are unfamiliar with hand operated dimmer switches, which may be located on the steering column of a vehicle, may prefer using foot operated dimmer switches to becoming familiar with hand operated dimmer switches.

It is therefore an object of this invention to provide a vehicle lighting system which varies the illumination of the roadway ahead of the vehicle in response to manipulation of either a hand operated dimmer switch located on the vehicle steering column or a foot operated dimmer switch located on the floor of the vehicle.

It is a further object of this invention to provide a vehicle lighting system comprising selectively energizable high and low beam headlamp arrays the energization of which is determined by the settings of hand and foot operated dimmer switches, one switch having settings in which the power source and a reference potential point are alternately connected to both arrays and the other switch having two settings in each of which the power source and the reference potential point are connected to the other side of an array.

The foregoing and other objects and advantages of the invention will become apparent from the following description and accompany drawings, in which.

Figures 1, 2:
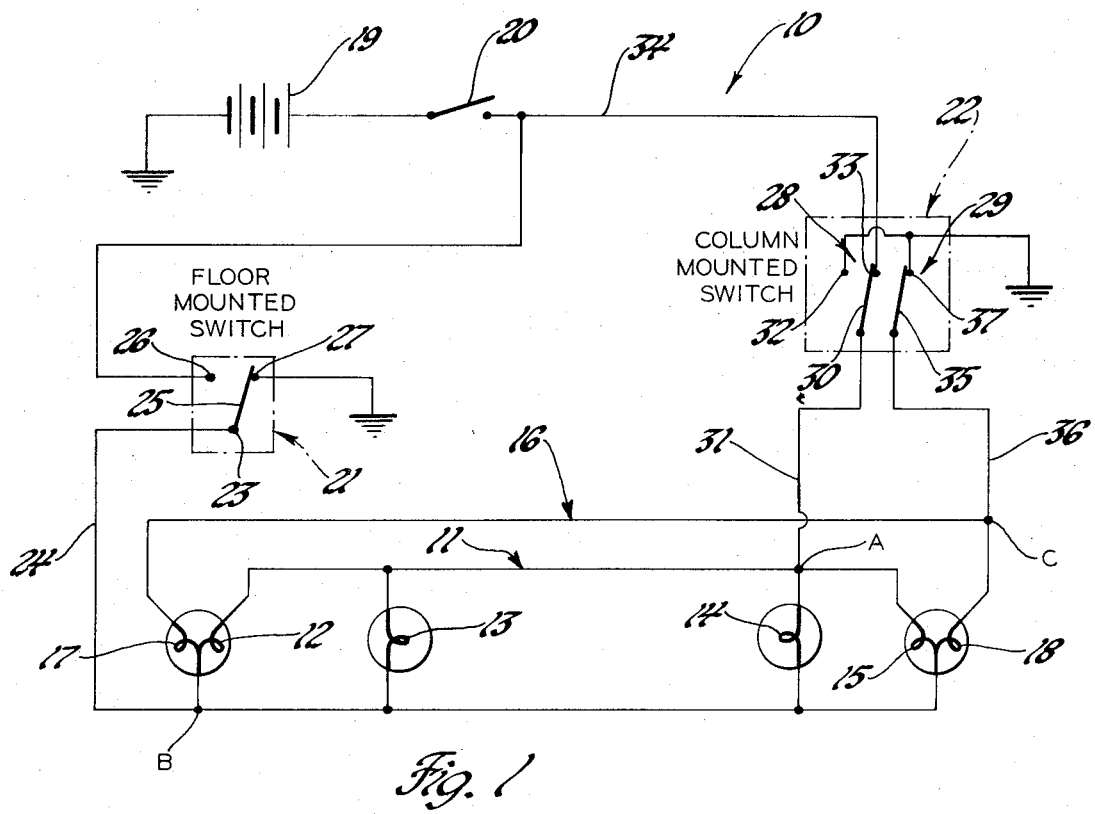
FIG. 1 is a schematic diagram of a vehicle lighting system embodying the principles of the subject invention.
FIG. 2 is a table illustrating the conditions under which the headlamps in the system of FIG. 1 are energized.

As shown in the drawings, a vehicle lighting system 10 that embodies the principles of the subject invention includes a first lamp array 11 comprising several high beam headlamps 12 through 15 connected in parallel between first and second terminals A and B and a second lamp array 16 comprising a pair of parallel connected low beam headlamps 17 and 18 that are connected in parallel between the second terminal B and a third terminal C. Energization of the lamp arrays 11 and 16 is provided by a suitable power source, such as a vehicle battery 19, having a grounded negative terminal, which serves as a point of reference potential. A normally open light switch 20, which may be of any well known type presently employed in motor vehicles, is provided in series with the battery 19 for selectively rendering the system 10 inoperable. When the light switch 20 is closed, energization of the lamp arrays 11 and 16 is controlled by first and second dimmer switches 21 and 22.

In the illustrated embodiment it is contemplated that the first dimmer switch 21 be mounted on the floor of the vehicle for operation by the vehicle operator's foot in a well known manner. In the illustrated embodiment the floor mounted switch 21 includes a single pole, double throw switch mechanism. The input terminal 23 of the floor mounted switch 21 is connected through a lead 24 to the second terminal B. The switch arm 25 of the floor mounted switch 21 is connected to the input terminal 23 and movable for engagement with the switch 21 output terminals 26 and 27. In the illustrated setting, which will hereafter be described as the first switch setting, the floor mounted switch 21 connects the second terminal B to ground through the output terminal 27. When the floor mounted switch 21 setting is changed to a second switch setting by the vehicle operator the switch arm 25 completes an electrical connection from the terminal B through the lead 24 and the output terminal 26 to the light switch 20.

The second dimmer switch 22 in the illustrated embodiment is contemplated as being mounted on the steering column of the vehicle. It includes second and third single pole, double throw switches 28 and 29. The second switch 28 includes a switch arm 30 that is connected through a lead 31 to terminal A, a grounded output terminal 32, and an output terminal 33 that is connected through a lead 34 to the light switch 20. The third switch 29 includes a switch arm 35 that is connected through a lead 36 to the third terminal C and is movable between the output terminal 33 and a grounded output terminal 37. As persons versed in the art will appreciate, the pivotally mounted switch arms 25, 30, and 35 of the switches 21 and 22 are illustrated only for descriptive purposes as the switches 21 and 22 may be of any well known configuration, many of which employ sliding contacts in place of pivotal switch arms.

The switch arms 30 and 35 in the column mounted switch 22 are ganged for concurrent operation. Accordingly, when the switch arms 30 and 35 are positioned as illustrated the column mounted switch 22 may be said to be in a first switch setting so as to connect the first terminal A to the light switch 20 while grounding the third terminal C through the switch arm 35. When the column mounted switch 22 is changed to a second switch setting the switch arm 30 grounds the first terminal A through the output terminal 32 while the switch arm 35 connects the third terminal C to the light switch 20 through the output terminal 33.

The operation of the lighting system 10 may be briefly summarized by reference to FIG. 2, which tabulates the operation of the lighting system 10 by reference to the settings of the floor and column mounted switches 21 and 22. The rows in the FIG. 2 table are indicative of the floor mounted switch 21 setting and the columns in FIG. 2 are indicative of the column mounted switch 22 setting. At the intersection of each row and column a notation is provided that indicates which of the head-lamps are energized, which of the terminals A, B, or C are connected to the positive side of the battery 19, and which of the terminals A, B, or C are connected to ground. For example, at the intersection of the row designating the first switch setting of the floor mounted switch 21 and the column designating the first switch setting of the column mounted switch 22 the word "high" indicates that the high beam headlamps 12 through 15 are energized when both of the switches 21 and 22 are in their respective first switch settings. In addition, the plus sign after the letter A designates that the first terminal A is connected to the positive terminal of the battery 19 and the minus sign after the letters B and C designate that the terminals B and C are grounded under these conditions. Corresponding notations are provided at the other row and column intersections in the table for the other combinations of switch settings. Thus, regardless of the setting of either dimmer switch, the other switch may be operated to change the lights from low to high beam, and vice versa.

While the foregoing description has been directed to the illustrated and preferred embodiment of the subject invention, persons versed in the art will appreciate that various modifications of this invention may be made without departing from its spirit.

What is claimed is:

1. A vehicle lighting system comprising, in combination, a power source having a grounded terminal; an array of parallel connected high beam lamps connected between first and second terminals; an array of parallel connected low beam lamps connected between the second terminal and a third terminal; a single pole-double throw switch having a movable contact connected to said second terminal, a first stationary contact connected to ground and a second stationary contact connected to said power source for selectively grounding said second terminal in a first setting and connecting said second terminal to said power source in a second setting and a double pole-double throw switch having first and second stationary contacts connected to ground and a third stationary contact connected to said power source and first and second gang-operated movable contacts connected, respectively, to said first and third terminals and operable to a first position in which said first movable contact is in electrical engagement with said third stationary contact and said second movable contact is in electrical engagement with said second stationary contact for selectively connecting said first terminal to said power source and said third terminal to ground and to a second position in which said first movable contact is in electrical engagement with said first stationary contact and said second movable contact is in electrical engagement with said third stationary contact for selectively connecting said first terminal to ground and said third terminal to said power source.

* * * * *